US012566642B2

(12) United States Patent
Xie

(10) Patent No.: US 12,566,642 B2
(45) Date of Patent: Mar. 3, 2026

(54) NODE MANAGEMENT METHOD, DEVICE AND APPARATUS, STORAGE MEDIUM, AND SYSTEM

(71) Applicant: ZTE Corporation, Shenzhen (CN)

(72) Inventor: Baoguo Xie, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 868 days.

(21) Appl. No.: 17/779,767

(22) PCT Filed: Oct. 26, 2020

(86) PCT No.: PCT/CN2020/123533
§ 371 (c)(1),
(2) Date: May 25, 2022

(87) PCT Pub. No.: WO2021/109750
PCT Pub. Date: Jun. 10, 2021

(65) Prior Publication Data
US 2022/0413937 A1      Dec. 29, 2022

(30) Foreign Application Priority Data

Dec. 2, 2019    (CN) .......................... 201911216078.6

(51) Int. Cl.
*G06F 9/50*              (2006.01)
(52) U.S. Cl.
CPC .......... *G06F 9/5077* (2013.01); *G06F 9/5072* (2013.01); *G06F 2209/505* (2013.01); *G06F 2209/508* (2013.01)

(58) Field of Classification Search
None
See application file for complete search history.

(56) References Cited

U.S. PATENT DOCUMENTS

| | | | |
|---|---|---|---|
| 10,891,168 B2 * | 1/2021 | Smola ................... | G06F 9/5077 |
| 2011/0194563 A1 * | 8/2011 | Shen ................... | G06F 9/45558 |
| | | | 718/1 |

(Continued)

FOREIGN PATENT DOCUMENTS

| | | |
|---|---|---|
| CN | 106375101 A | 2/2017 |
| CN | 107819598 A | 3/2018 |

(Continued)

OTHER PUBLICATIONS

A. Patil, A. Shah, S. Gaikwad, A. A. Mishra, S. S. Kohli and S. Dhage, "Fault Tolerance in Cluster Computing System," 2011 International Conference on P2P, Parallel, Grid, Cloud and Internet Computing, Barcelona, Spain, 2011, pp. 408-412. (Year: 2011).*

(Continued)

*Primary Examiner* — Frank D Mills
(74) *Attorney, Agent, or Firm* — Vivacqua Crane, PLLC

(57) ABSTRACT

A node management method, a node management apparatus, a cluster node manager, a non-transitory computer-readable storage medium and a network function virtualization system are disclosed. The node management method may include: receiving node life cycle management information (S11); performing life cycle management on a node according to the node life cycle management information, where the node life cycle management includes at least one of node creation, node scaling and node release (S12).

17 Claims, 5 Drawing Sheets

(56) References Cited

U.S. PATENT DOCUMENTS

| | | | | |
|---|---|---|---|---|
| 2016/0335111 | A1 | 11/2016 | Bruun et al. | |
| 2017/0099203 | A1* | 4/2017 | Shapur | H04L 67/1034 |
| 2020/0012577 | A1* | 1/2020 | Sarnad | G06F 11/2041 |
| 2020/0310881 | A1* | 10/2020 | Gonzalez | G06F 9/5027 |
| 2020/0319935 | A1* | 10/2020 | Srivastava | G06F 9/5011 |

FOREIGN PATENT DOCUMENTS

| | | | | |
|---|---|---|---|---|
| CN | 108628660 A | 10/2018 | | |
| CN | 109947557 A | 6/2019 | | |
| CN | 111090495 A | 5/2020 | | |
| EP | 3584998 A1 * | 12/2019 | | G06F 9/45558 |
| WO | 2017018435 A1 | 2/2017 | | |
| WO | 2018143235 A1 | 8/2018 | | |
| WO | WO-2018171392 A1 * | 9/2018 | | G06F 9/45558 |

OTHER PUBLICATIONS

C. T. Yang, W. L. Chou, C. H. Hsu and A. Cuzzocrea, "On Improvement of Cloud Virtual Machine Availability with Virtualization Fault Tolerance Mechanism," 2011 IEEE Third International Conference on Cloud Computing Technology and Science, Athens, Greece, 2011, pp. 122-129. (Year: 2011).*

Dilger, M. "Docker Health Checks," Effective Trainings Docker Blog, 2017, https://effective-docker.github.io/docker-healthchecks/.

European Patent Office. Communication Pursuant to Article 94(3) EPC for EP Application No. 20895097.2, mailed Dec. 3, 2024, pp. 1-9.

Japan Patent Office. Notice of Reasons for Refusal for JP Application No. 2022-532127 and English translation, mailed Jul. 5, 2023, pp. 1-8.

International Searching Authority. International Search Report and Written Opinion for PCT Application No. PCT/CN2020/123533 and English translation, mailed Jan. 27, 2021, pp. 1-11.

Anonymous. "Autoscaling with Heat," Senlin documentation, 2019, https://docs.openstack.org/senlin/latest/scenarios/autoscaling_heat.html.

Anonymous. "Autoscaling," Wikipedia, 2018, https://en.wikipedia.org/w/index.php?title=Autoscaling&oldid=846882332.

Anonymous. "Nodes," Senlin documentation, 2017, https://docs.openstack.org/senlin/latest/contributor/node.html.

Anonymous. "Region Placement Policy," Senlin documentation, 2018, https://docs.openstack.org/senlin/latest/user/policy_types/region_placement.html.

European Patent Office. Extended European Search Report for EP Application No. 20895097.2, mailed Dec. 13, 2023, pp. 1-12.

Kim, M., et al. "TOSCA-based Clustering Service for Network Function virtualization," International Conference on Information and Communication Technology Convergence (ICTC), IEEE, 2016, pp. 1176-1178.

Sik, K., et al. "An Automated Clustering Service Manager in Open Platform Network Function Virtualization," Soongsil University, 2016, pp. 1069-1070.

* cited by examiner

NODE MANAGEMENT METHOD, DEVICE AND APPARATUS, STORAGE MEDIUM, AND SYSTEM

CROSS-REFERENCE TO RELATED APPLICATION

This application is a national stage filing under 35 U. S.C. § 371 of international application number PCT/CN2020/123533, filed on Oct. 26, 2020, which claims priority to Chinese patent application No. 201911216078.6 filed on Dec. 2, 2019. The contents of these applications are incorporated herein by reference in their entirety.

TECHNICAL FIELD

The present disclosure relates to the technical field of communication networks, and in particular to a node management method, a node management apparatus, a cluster node manager, a non-transitory computer-readable storage medium and a network function virtualization system.

BACKGROUND

In open source technologies such as Kubernetes (K8s), cluster nodes need to be used to run the container integration environment. Nodes are operating nodes in the Kubernetes cluster. Services are run on nodes to run pod and communicate with master, etc. In the Network Function Virtualization (NFV) system, the life cycle management of nodes in the cluster is not involved.

SUMMARY

The present disclosure provides a node management method, a node management apparatus, a cluster node manager, a non-transitory computer-readable storage medium and a network function virtualization system.

According to an embodiment of the present disclosure, provided is a node management method. The method may include: receiving node life cycle management information; and performing life cycle management on a node based on the node life cycle management information, the node life cycle management including one or more of: node creation, node scaling and node release.

According to an embodiment of the present disclosure, provided is a node management apparatus. The apparatus may include: a receiving module configured to receive node life cycle management information; and a management module configured to perform life cycle management on a node based on the node life cycle management information, the node life cycle management including one or more of: node creation, node scaling and node release.

According to an embodiment of the present disclosure, provided is a cluster node manager. The cluster node manager may include: one or more processors; and a memory configured to store one or more programs. The one or more programs, when executed by the one or more processors, cause the one or more processors to carry out the method according to any one of the embodiments of the present disclosure.

According to an embodiment of the present disclosure, provided is a network function virtualization system. The system may include: an operation-support system (OSS), a network function virtualization orchestrator (NFVO), a virtualized infrastructure manager (VIM) and a cluster node manager (CNM). The NFVO or the OSS transmits node life cycle management information to the CNM. The CNM generates a node life cycle management request based on the node life cycle management information and transmits the node life cycle management request to the VIM. The VIM performs a life cycle management operation on a node based on the node life cycle management request.

An embodiment of the present disclosure provides a non-transitory computer-readable storage medium storing a computer program which, when executed by a processor, cause the processor to carry out the method according to any one of the embodiments of the present disclosure.

DETAILED DESCRIPTION

The embodiments of the present disclosure will be described below in detail with reference to the accompanying drawings. It is to be noted that the embodiments in the present disclosure and the features in the embodiments can be arbitrarily combined with each other if not conflicted.

The steps shown in the flowcharts in the accompanying drawings can be executed in a computer system, for example, a set of computer-executable instructions. In addition, although a logic order is shown in the flowcharts, in some cases, the steps shown or described can be executed in an order different from this logic order.

In open source technologies such as Kubernetes, cluster nodes need to be used to run the container integration environment. Nodes are operating nodes in the kubernetes cluster, which may be virtual machines or physical machines. Some services are run on nodes to run pod and communicate with master, and the like. The services on one node include the docker runtime environment, and the like. Kubernetes needs to download container mirror images on nodes to establish container objects, such as POD, Service and Deployment. The service providers or operators can load applications on the container objects to realize network system services in the container environment.

Network Function Virtualization (NFV) is a software processing technology that uses general hardware and virtual technologies to carry other functions in order to reduce high equipment cost of the network. Through software/hardware decoupling and function abstraction, the NFV enables the functions of network devices to no longer depend on dedicated hardware, so that resources can be shared fully and flexibly to realize the rapid development and deployment of new services, and automatic deployment, Auto Scaling, fault isolation, self-healing or the like can be carried out according to actual service requirements.

Figure 1:
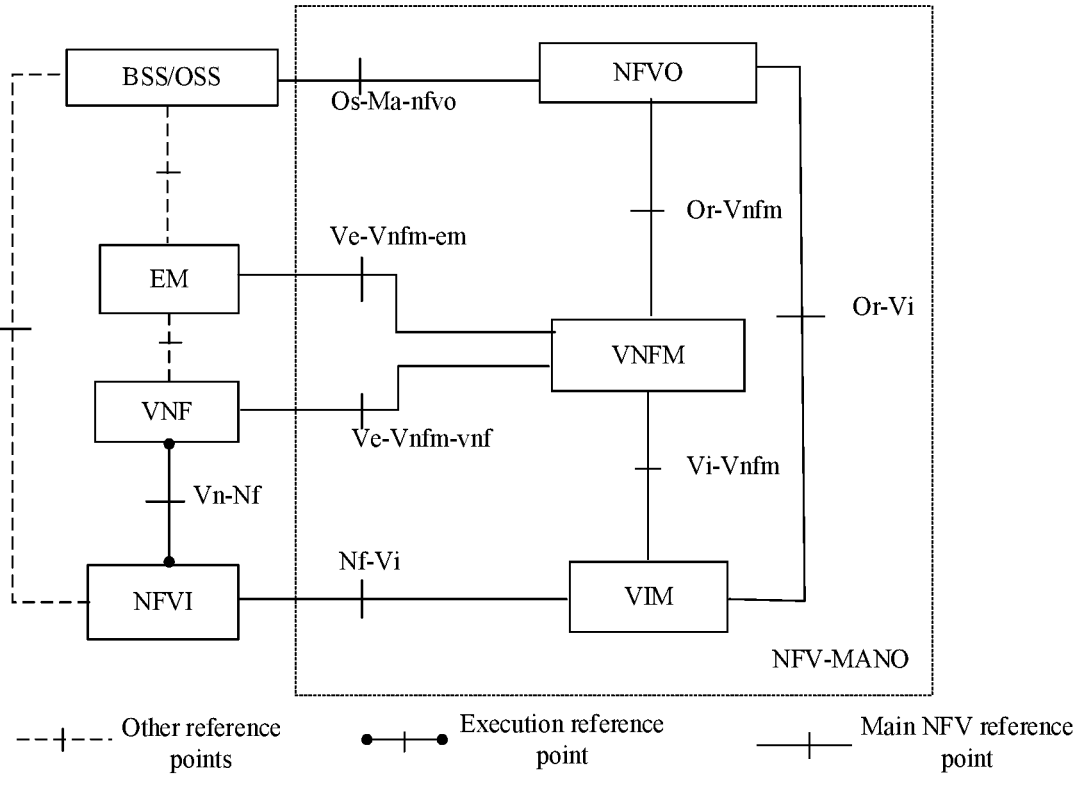
FIG. 1 is a schematic diagram of an NFV system architecture defined by ETSI.

FIG. 1 is a schematic diagram of an NFV system architecture defined by the ETSI. As shown in FIG. 1, the NFV system architecture defined by the European Telecommunications Standards Institute (ETSI) mainly includes: an Operation-Support System/Business Support System (OSS/BSS), Virtualized Network Functions (VNFs), a Network Functions Virtualization Infrastructure (NFVI) and a VNF-Management and Orchestration (NFV-MANO) system. The NFVI is mainly configured to fully virtualize hardware resources such as computation, storage and network and mapping them into virtual resources. The NVF is configured to realize various conventional physical network functions by software. The NVF runs on the NFVI and uses virtual resources that are virtualized by the NFVI. The NFV-MANO is configured to manage and orchestrate the relationship between the VNFs and the NFVI and the connection relationship between NVFs and/or between NVFs and other Physical Network Functions (PNFs).

The NFV-MANO includes: a Virtualized Infrastructure Manager (VIM), a Virtualized Network Function Manager (VNFM) and a Network Function Virtualization Orchestrator (NFVO). The VIM is configured to control and manage virtualized resources. In addition, the VIM may further include a Physical Infrastructure Manager (PIM) function which is responsible for managing bare metal resources such as physical servers. The VNFM is configured to manage the life cycle of the VNF. The NVFO is configured to orchestrate and manage the virtualized infrastructure and manage the life cycle of the Network Service (NS).

Figure 2:
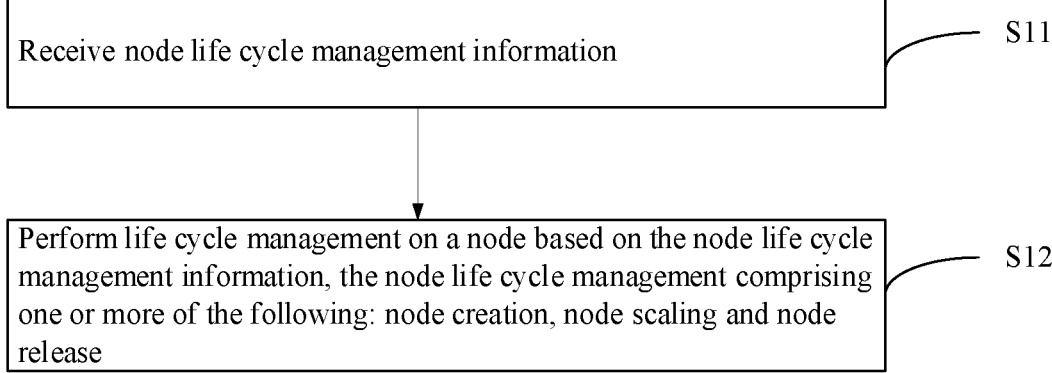
FIG. 2 is a flowchart of a node management method according to an embodiment of the present disclosure.

FIG. 2 is a flowchart of a node management method according to an embodiment of the present disclosure. The node management method provided in the embodiment is mainly applicable to the management of the life cycle of nodes in the NFV system. The node management method is executed by a node management apparatus, and the node management apparatus may be implemented by hardware and/or software.

As shown in FIG. 2, the node management method provided in the embodiment of the present disclosure mainly includes steps S11 and S12.

At S11, node life cycle management information is received.

At S12, life cycle management is performed on a node based on the node life cycle management information, where the node life cycle management includes one or more of: node creation, node scaling and node release.

In an implementation, the node life cycle management information is transmitted from one of the following nodes:

an operation-support system (OSS);

a network function virtualization orchestrator (NFVO);

a virtualized network function manager (VNFM), where the VNFM forwards the node life cycle management information transmitted by the NFVO.

In an implementation, the performing life cycle management on a node based on the node life cycle management information includes: generating a node life cycle management request based on the node life cycle management information; transmitting the node life cycle management request to a virtualized infrastructure manager (VIM), the node life cycle management request being used to instruct the VIM to perform a node resource management operation on the node, and the VIM generating operation result information after performing the node resource management operation; and, receiving the operation result information fed back by the VIM, and forwarding the operation result information to the OSS or NFVO.

In an implementation, in the case that the node life cycle management request is a node creation request, the performing life cycle management of node creation on a node based on the node life cycle management request includes: transmitting the node creation request to a VIM in a region to which the node belongs, the node creation request carrying a node resource information model, the node resource information model being used to instruct the VIM to create a corresponding node, the node resource information model including one or more of node scale, node identifier and node resource, the node resource information model being generated based on node creation information, the node creation information including one or more of: node type, node scale, node resource and node deployment; and, receiving node creation completion information fed back by the VIM, the node creation completion information carrying the number of created nodes and resources allocated to nodes.

In an implementation, after the receiving node creation completion information fed back by the VIM, the method further includes: adding the created nodes into a cluster; and, updating cluster information, the cluster information including a cluster identifier and node information of all nodes in the cluster.

In an implementation, after the updating cluster information, the method further includes: transmitting node creation success information to the OSS or the NFVO, the node creation success information including the cluster identifier and the node information of all nodes in each cluster.

In an implementation, the VIM in the region to which the node belongs is determined based on the node deployment.

In an implementation, in the case that the node life cycle management request is a node scaling request, the performing life cycle management of node scaling on a node based on the node life cycle management request includes: transmitting the node scaling request to a VIM in a region to which the node belongs, the node scaling request carrying a node scaling information model, the node scaling information model including node scaling scale and node resource demand, the node scaling request being used to instruct the VIM to perform a node scaling operation, and the VIM generating node scaling result information after performing the node scaling operation; and, receiving node scaling result information fed back by the VIM.

In an implementation, prior to the transmitting the node scaling request to a VIM in a region to which the node belongs, the method further includes: determining whether to initiate the node scaling request according to a node scaling policy.

In an implementation, the determining whether to initiate the node scaling request according to a node scaling policy includes: in the case that node resources are insufficient or the node scale is insufficient, initiating a node scaling out/up request, node scaling out/up including increasing the node resources (scaling up) or increasing the node scale (scaling out); and, in the case that idle node resources are more than resources required by a service, initiating a node scaling in/down request, node scaling in/down including decreasing the node resources (scaling down) or decreasing the node scale (scaling in).

In an implementation, prior to the transmitting the node scaling request to a VIM in a region to which the node belongs, the method further includes: transmitting a query request to the VIM in the region to which the node belongs, the query request being used to instruct the VIM to query whether idle resources satisfy the node resource demand; in the case of receiving that the idle resources satisfy the node resource demand, which is transmitted by the VIM, executing an operation of transmitting the node scaling request to the VIM; and, in the case receiving that the idle resources do not satisfy the node resource demand, which is transmitted by the VIM, updating the node scaling scale and the node resource demand.

In an implementation, after the receiving node scaling result information fed back by the VIM, the method further includes: in the case that the node scaling result information is creating a new node, adding the newly created node into a cluster; in the case that the node scaling result information is adding created node resources, updating node information of created nodes in the cluster; in the case that the node scaling result information is releasing created nodes, deleting the created nodes in the cluster; and, in the case that the node scaling result information is decreasing created node resources, updating node information of the created nodes in the cluster.

In an implementation, in the case that the node life cycle management request is a node release request, the performing life cycle management of node release on a node based on the node life cycle management request includes: transmitting the node release request to a VIM in a region to which the node belongs, the node release request carrying a node identifier, the node release request being used to instruct the VIM to release a node and resources occupied by the node, and the VIM generating node release result information after completing the node release operation; receiving the node release result information fed back by the VIM, the node release result information carrying an identifier of the released node; and, deleting the released node from the cluster.

In an implementation, the node release request is generated in one of the following cases: more idle nodes than required nodes; or presence of an abnormal node in the cluster.

In an implementation, the method further includes: transmitting a subscription request to the VIM, the subscription request being used to instruct the VIM to report node status information within a set time; and, in the case of receiving the node status information fed back by the VIM, transmitting the node status information to the OSS or NFVO, the node status information including a cluster identifier of the cluster, a node identifier and node resource information.

In an implementation, the method includes: transmitting a node status query request to the VIM, the node status query request being used to instruct the VIM to report the node status information.

In an implementation, the method includes: receiving node abnormity information, the node abnormity information being fed back by the VIM in the case that an abnormal node presents in the cluster; transmitting a node creation request to the VIM, the node creation request carrying a node resource information model, node resources in the node resource information model being the same as node resources in the node resource information model of the abnormal node; and, transmitting node abnormal status information to the OSS or the NFVO, the node abnormal status information carrying information of the newly created node.

Figure 3:
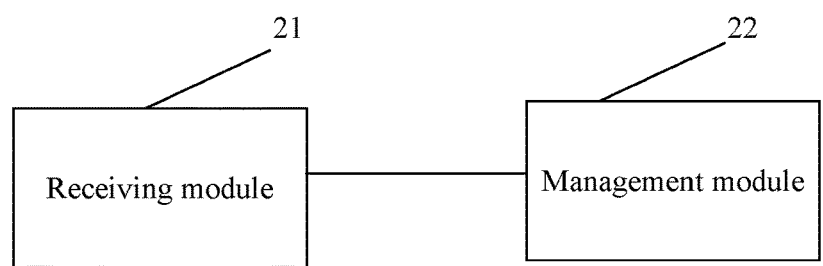
FIG. 3 is a schematic structural diagram of a node management apparatus according to an embodiment of the present disclosure.

FIG. 3 is a flowchart of a node management apparatus according to an embodiment of the present disclosure. The node management apparatus provided in the embodiment is mainly applicable to the management of the life cycle of nodes in the NFV system, and the node management apparatus may be implemented by hardware and/or software.

As shown in FIG. 3, the node management apparatus provided in the embodiment of the present disclosure mainly includes a receiving module 21 and a management module 22.

The receiving module 21 is configured to receive node life cycle management information.

The management module 22 is configured to perform life cycle management on a node based on the node life cycle management information, the node life cycle management including one or more of: node creation, node scaling and node release.

In an implementation, the node life cycle management information is transmitted from one of the following nodes:
an operation-support system (OSS);
a network function virtualization orchestrator (NFVO);
a virtualized network function manager (VNFM), the VNFM forwarding the node life cycle management information transmitted by the NFVO.

In an implementation, the management module 22 is configured to: generate a node life cycle management request based on the node life cycle management information; transmit the node life cycle management request to a virtualized infrastructure manager (VIM), the node life cycle management request being used to instruct the VIM to perform a node resource management operation on the node, and the VIM generating operation result information after performing the node resource management operation; and, receive the operation result information fed back by the VIM, and forward the operation result information to the OSS or NFVO.

In an implementation, the management module 22 is configured to: in the case that the node life cycle management request is a node creation request, perform life cycle management of node creation on a node based on the node life cycle management request. In an embodiment, the management module 22 is configured to: transmit the node creation request to a VIM in a region to which the node belongs, the node creation request carrying a node resource information model, the node resource information model being used to instruct the VIM to create a corresponding node, the node resource information model including one or more of node scale, node identifier and node resource, the node resource information model being generated based on node creation information, the node creation information including one or more of: node type, node scale, node resource and node deployment; and, receive node creation completion information fed back by the VIM, the node creation completion information carrying the number of created nodes and resources allocated to nodes.

In an implementation, the management module 22 is configured to: after the receiving node creation completion information fed back by the VIM, add the created nodes into a cluster; and, update cluster information, the cluster information including a cluster identifier and node information of all nodes in the cluster.

In an implementation, the management module 22 is configured to: after updating cluster information, transmit node creation success information to the OSS or the NFVO, the node creation success information including the cluster identifier and the node information of all nodes in each cluster.

In an implementation, the VIM in the region to which the node belongs is determined based on the node deployment.

In an implementation, the management module 22 is configured to: in the case that the node life cycle management request is a node scaling request, perform life cycle management of node scaling on a node based on the node life cycle management request. In an embodiment, the management module 22 is configured to: transmit the node scaling request to a VIM in a region to which the node belongs, the node scaling request carrying a node scaling information model, the node scaling information model including node scaling scale and node resource demand, the node scaling request being used to instruct the VIM to perform a node scaling operation, and the VIM generating node scaling result information after performing the node scaling operation; and, receive node scaling result information fed back by the VIM.

In an implementation, the management module 22 is configured to: prior to transmitting the node scaling request to a VIM in a region to which the node belongs, determine whether to initiate the node scaling request according to a node scaling policy.

In an implementation, the management module 22 is configured to: in the case that node resources are insufficient or the node scale is insufficient, initiate a node scaling out/up request, node scaling out/up including increasing the node resources or increasing the node scale; and, in the case that idle node resources are more than resources required by a service, initiate a node scaling in/down request, node scaling in/down including decreasing the node resources or decreasing the node scale.

In an implementation, the management module 22 is configured to: prior to transmitting the node scaling request to a VIM in a region to which the node belongs, transmit a query request to the VIM in the region to which the node belongs, the query request being used to instruct the VIM to query whether idle resources satisfy the node resource demand; in the case of receiving that the idle resources satisfy the node resource demand, which is transmitted by the VIM, execute an operation of transmitting the node scaling request to the VIM; and, in the case of receiving that the idle resources do not satisfy the node resource demand, which is transmitted by the VIM, update the node scaling scale and the node resource demand.

In an implementation, the management module 22 is configured to: after receiving the node scaling result information fed back by the VIM, in the case that the node scaling result information is creating a new node, add the newly created node into a cluster; in the case that the node scaling result information is adding created node resources, update node information of created nodes in the cluster; in the case that the node scaling result information is releasing created nodes, delete the created nodes in the cluster; and, in the case that the node scaling result information is decreasing created node resources, update node information of the created nodes in the cluster.

In an implementation, the management module 22 is configured to: in the case that the node life cycle management request is a node release request, perform life cycle management of node release on a node based on the node life cycle management request. In an embodiment, the management module 22 is configured to: transmit the node release request to a VIM in a region to which the node belongs, the node release request carrying a node identifier, the node release request being used to instruct the VIM to release a node and resources occupied by the node and the VIM generating node release result information after completing the node release operation; receive the node release result information fed back by the VIM, the node release result information carrying an identifier of the released node; and, delete the released node from the cluster.

In an implementation, the node release request is generated in one of the following cases: more idle nodes than required nodes; or presence of an abnormal node in the cluster.

In an implementation, the management module 22 is configured to: transmit a subscription request to the VIM, the subscription request being used to instruct the VIM to report node status information within a set time; and, in the case of receiving the node status information fed back by the VIM, transmit the node status information to the OSS or NFVO, the node status information including a cluster identifier of the cluster, a node identifier and node resource information.

In an implementation, the management module 22 is configured to transmit a node status query request to the VIM, the node status query request being used to instruct the VIM to report the node status information.

In an implementation, the management module 22 is configured to: receive node abnormity information, the node abnormity information being fed back by the VIM in the case that an abnormal node presents in the cluster; transmit a node creation request to the VIM, the node creation request carrying a node resource information model, node resources in the node resource information model being the same as node resources in the node resource information model of the abnormal node; and, transmit node abnormal status information to the OSS or the NFVO, the node abnormal status information carrying information of the newly created node.

Figure 4:
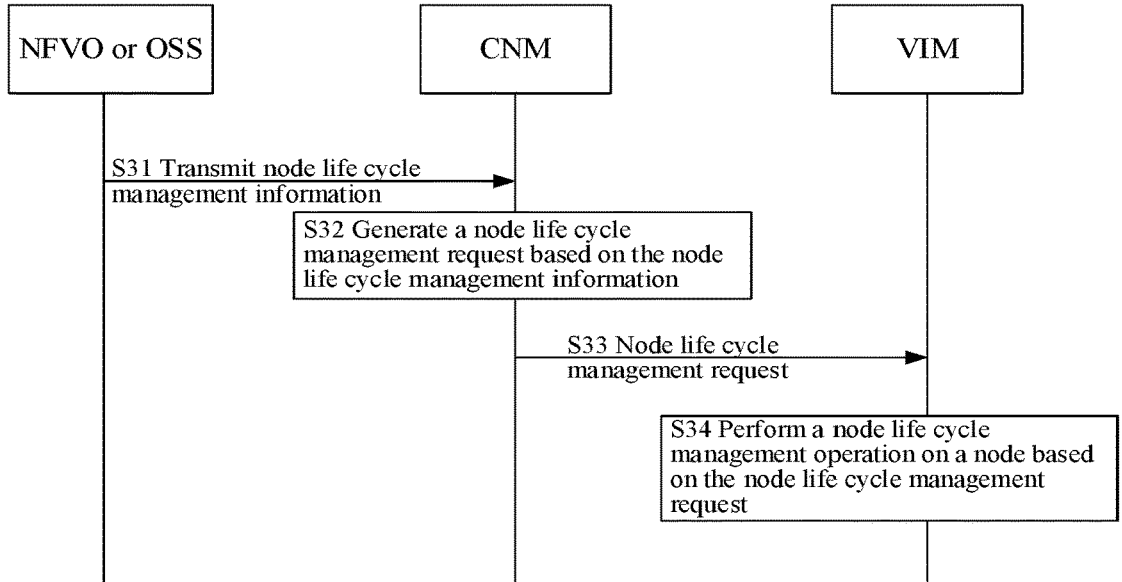
FIG. 4 is a schematic structural diagram of an NFV system according to an embodiment of the present disclosure.

FIG. 4 is a schematic structural diagram of a network function virtualization system according to an embodiment of the present disclosure. As shown in FIG. 4, the system includes an operation-support system (OSS), a network function virtualization orchestrator (NFVO), a virtualized infrastructure manager (VIM) and a cluster node manager (CNM).

At S31, the NFVO or the OSS transmits node life cycle management information to the CNM.

At S32, the CNM generates a node life cycle management request based on the node life cycle management information.

At S33, the CNM transmits the node life cycle management request to the VIM.

At S34, the VIM performs a life cycle management operation on a node based on the node life cycle management request.

In an implementation, after performing the management operation on the node, the VIM generates the operation result information of the node, and transmits the operation result information of the node to the CNM; and, the CNM forwards the operation result information of the node to the NFVO or the OSS.

In an implementation, in the case that the node life cycle management request is a node creation request, the CNM generates a node resource information model based on the node creation information, the node creation information including one or more of node type, node scale, node resource and node deployment, the node resource information model including one or more of node scale, node identifier and node resource;

the CNM transmits the node creation request to a VIM in a region to which the node belongs, the node creation request carrying the node resource information model;

the VIM creates a corresponding node based on the node resource information model;

the CNM receives node creation completion information fed back by the VIM, and adds the node into a cluster. The node creation completion information carries the number of created numbers and resources allocated to nodes.

In an implementation, in the case that the life cycle management request is a node scaling request, the method further includes:

the CNM transmits the node scaling request to the VIM, the node scaling request carrying a node scaling information model, and the node scaling information model including scaling scale and node resource demand;

the VIM performs a node scaling operation based on the node scaling request and generates node scaling result information;

the CNM receives the node scaling result information fed back by the VIM, and updates information of the cluster to which the node belongs.

In an implementation, the CNM transmits a query request to a VIM in a region to which the node belongs. The VIM queries, based on the query request, whether idle resources satisfy the node resource demand and feeds back a result of query to the CNM. The CNM transmits the node scaling request to the VIM, in the case of receiving that the idle resources satisfy the node resource demand, which is transmitted by the VIM. The CNM updates the node scaling scale and the node resource demand, in the case of receiving that the idle resources do not satisfy the node resource demand, which is transmitted by the VIM.

In an implementation, in the case that the node life cycle management request is a node release request, the CNM transmits the node release request to a VIM in a region to which the node belongs, the node release request carrying a node identifier;

the VIM releases a node and resources occupied by the node based on the node release request, and generates node release result information;

the CNM receives the node release result information fed back by the VIM, the node release result information carrying an identifier of the released node;

the CNM deletes the released node from the cluster.

In an implementation, the CNM transmits a subscription request to the VIM. The VIM reports node status information within a set time based on the subscription request. In the case of receiving the node status information fed back by the VIM, the CNM transmits the node status information to the OSS or NFVO, the node status information including a cluster identifier of the cluster, a node identifier and node resource information.

In an implementation, in the case that an abnormal node presents in the cluster, the VIM generates node abnormity information and feeds back the node abnormity information to the CNM. The CNM receives the node abnormity information and transmits a node creation request to the VIM, the node creation request carrying a node resource information model, and node resources in the node resource information model being the same as node resources in the node resource information model of the abnormal node. The VIM creates, based on the node creation request, a new node to replace the abnormal node. The CNM transmits node abnormal status information to the OSS or the NFVO, the node abnormal status information carrying information of the newly created node.

Figure 5:
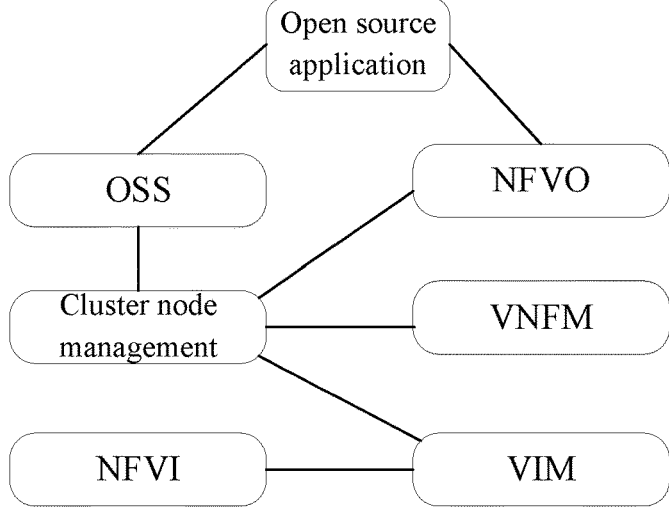
FIG. 5 is a structural diagram of an NFV system with a cluster management function according to an embodiment of the present disclosure.

In a practical example, in the present disclosure a cluster node manager (CNM) is newly defined. The CNM may be physical or logical. If the CNM is logical, the CNM can be embedded into a functional entity, for example, an NFVO, a VNFM, a VIM, etc. If the CNM is physical, the CNM can be arranged in a network function virtualization system as a separate entity. FIG. 5 is a structural diagram of an NFV system with a CNM according to an embodiment of the present disclosure.

As shown in FIG. 5, the CNM is responsible for node life cycle management, including node creation, node scaling, node release or other functions.

The CNM is also responsible for updating cluster nodes and adding the newly created node into a certain cluster. During node updating, the cluster where the related node is located is updated; and, during node release, this node is deleted from a corresponding cluster.

The CNM can interact with the OSS/NFVO, and can acquire the creation information, updating information and release information of the related node from the OSS/NFVO and reports information indicating that the node has been created, updated and released, to the OSS/NFVO in time.

The CNM can interact with the VIM. The CNM can find a VIM in the deployment region according to the node deployment information and request the VIM to create, update and release a node. After successful creation, the VIM notifies information indicating that the node has been created, updated and released, to the CNM in time.

The CNM can interact with the VNFM and acquire creation model information of the node from the VNFM.

When a node is abnormal, the VIM detects node abnormity and notifies the node abnormity to the CNM. The CNM will reports node abnormity information to the OSS/NFVO in time. The CNM will request the VIM to create a complete replacement node to replace the abnormal node.

Figure 6:
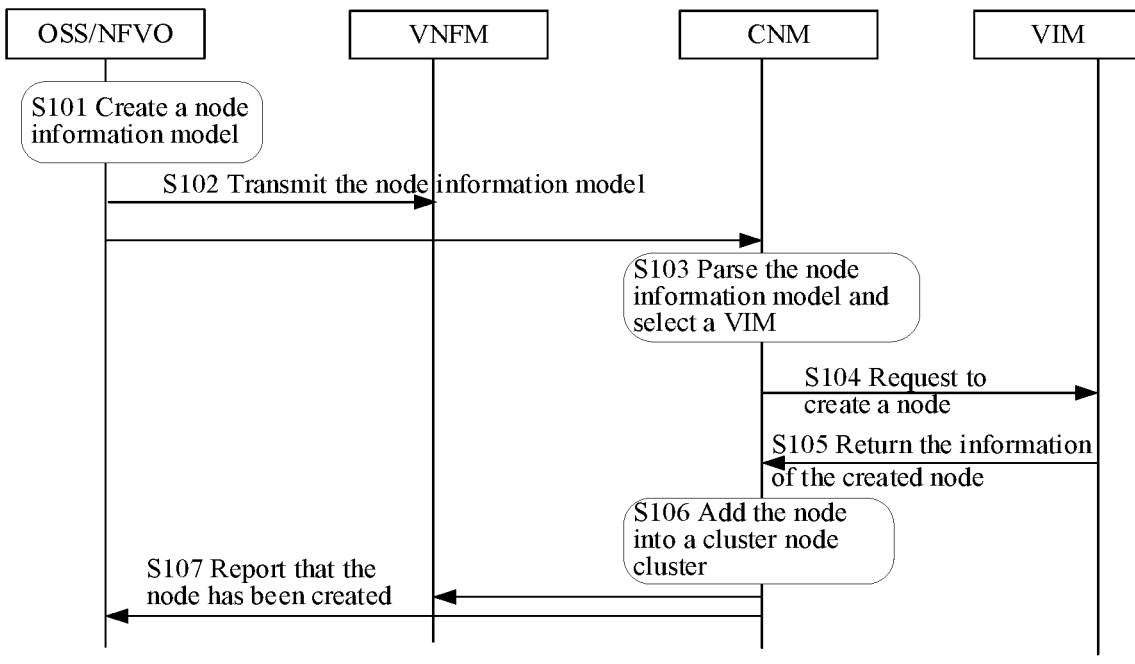
FIG. 6 is a flowchart of a node creation method according to an embodiment of the present disclosure.

In a practical example, a process of node creation is provided. FIG. 6 is a flowchart of a node creation method according to an embodiment of the present disclosure. As shown in FIG. 6, in the embodiment, the OSS/NFVO initiates a node creation request according to the network planning, third-party application or operator requirements, the node creation request carrying a node creation information model. Upon receiving the node creation request, the CNM parses the node creation information model. The CNM generates a node resource information model, selects a VIM according to node deployment information in the node resource information model, transmits the node creation request and the node resource information model to the selected VIM, and requests the VIM to create a node. After the VIM successfully creates the node, the VIM returns node creation success information. The CNM adds the created node into a certain Cluster node cluster, and notifies the OSS/NFVO that the requested node is created successfully. The node creation method may include steps S101 to S107.

At S101, an operator carries out a planning design according to user requirements and network planning, and the required node creation information model (including node type, node scale (the number of nodes), node resource demand, node deployment or the like is planned and designed by a network function descriptor (Virtualized Network Function Descriptor/Physical Network Function Descriptor (VNFD/PNFD).

The node creation information model may also be planned and designed by utilizing a newly defined node function descriptor template. The node function descriptor template is used by the OSS/NFVO to transmit node creation information to the CNM.

At S102, the OSS/NFVO directly transmits the node creation information model to the CNM, or may forward the node creation information model to the CNM through the VNFM, where the VNFM forwards the creation information model transmitted by the NFVO.

At S103, the CNM parses the received node creation information model and parses related node information in the network function descriptor or node function descriptor to generate a node resource information model. The node resource information model includes resource related information, such as node scale, node identifier and resources (computation, storage and network) required by the node.

At S104, the CNM selects, according to the node deployment information, a VIM in a region where the node is located, initiates a node creation request to the VIM, and transmits the node creation request to the VIM/PIM in the deployment region where the node is located, the node creation request carrying the node resource information model, including node scale, node identifier and resources (computation, storage and network) required by the node.

At S105, the VIM creates a corresponding node according to the node resource information model, and returns node creation completion information. The carried information includes, but is not limited to, the number of created nodes and the resources (computation resources, storage resources and network resources) allocated to nodes.

At S106, the CNM adds the created node into a Cluster, and updates Cluster information. Cluster node information includes a Cluster ID, and the information of all nodes in the cluster, for example, node identifier, node resource, node status, and the like.

At S107, the CNM notifies the OSS/NFVO that the node has been created, and carries Cluster node creation success information, including the Cluster node ID and the identifier, resource, deployment position or other information of the created node in each Cluster node cluster.

Figure 7:
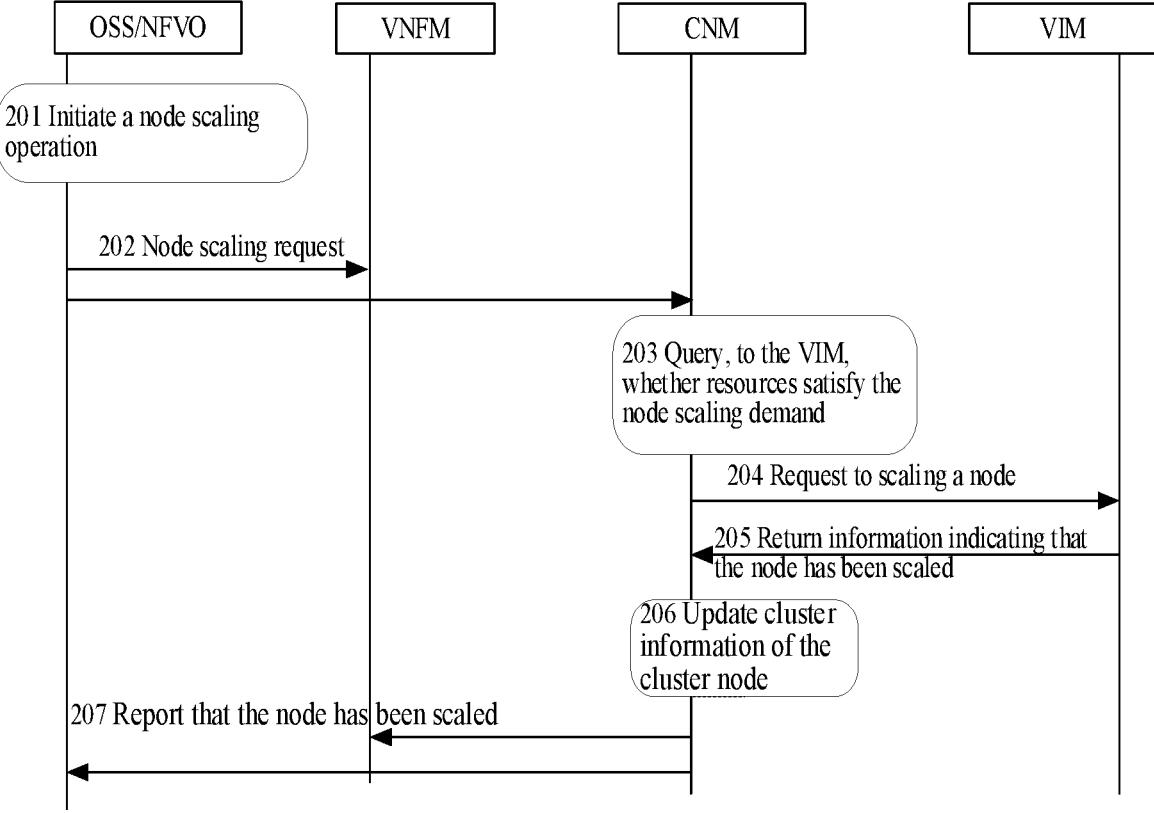
FIG. 7 is a flowchart of a node scaling method according to an embodiment of the present disclosure.

In a practical example, a node scaling process is described in the embodiment. FIG. 7 is a flowchart of a node scaling method according to an embodiment of the present disclosure. As shown in FIG. 7, the OSS/NFVO may initiate a node scaling request, or the CNM may actively initiate a node scaling request. Upon receiving the scaling request, the CNM queries the selected VIM whether resources satisfy the node scaling demand. If the resources do not satisfy the node scaling demand, the OSS/NFVO needs to update the node scaling demand, or the CNM actively updates the node scaling demand to enable the resources of the VIM to satisfy the scaling demand.

The CNM initiates a node scaling request to the VIM, and the VIM executes a node scaling operation. Two types of scaling present, i.e., increasing nodes or decreasing resources, and increasing nodes or releasing the created nodes. After the node scaling is successful, the CNM updates the Cluster node cluster, and reports the result of scaling to the OSS/NFVO. The node scaling process may include steps S201 to S207.

At S201, the node scaling request can be triggered by the OSS/NFVO or actively initiated by the CNM. The OSS/NFVO can trigger the node scaling request according to a node scaling policy, for example, according to a preset condition that the number of used nodes is greater than a certain ratio (e.g., 80%); or, a node usage demand from a third party, for example, a node activation demand from Kubernetes (K8S).

The CNM can also actively initiate node scaling according to the node scaling policy, for example, the existing nodes do not satisfy the service requirements.

When the node resources are insufficient or the node scale is insufficient, node scaling out/up is initiated, including increasing node resources and increasing the node scale. If idle node resources are more than the resources required by the service, node scaling in/down is initiated, including decreasing node resources and decreasing the node scale.

At S202, the CNM receives the node scaling request initiated by the OSS/NFVO or the node scaling request forwarded by the VNFM, where the request message carries a Cluster identifier and a node scaling information model, and the node scaling information model includes the node scaling scale, the resources required by the node or other information.

If the CNM actively initiates a node scaling operation according to the scaling policy, the CNM can actively generate a node scaling information model, including the node scaling scale, the resources required by the node or other information.

At S203, before the CNM initiates the node scaling operation, the CNM queries, according to the node deployment information, the VIM in the region where the node is located whether idle resources satisfy the node resource demand; and, if the idle resources do not satisfy the node resource demand, the CNM transmits feedback to the OSS/NFVO, and the OSS/NFVO updates the node scaling scale and scaling resources.

If the CNM actively initiates the node scaling operation, the node scaling scale and scaling resources are actively adjusted by the CNM.

At 204, the CNM initiates a scaling request to the VIM, and the VIM executes a node scaling operation. During the node scaling out/up operation, the VIM generates a new node according to the node scaling information, and allocates required resources or increases the created node resources. During the scaling in/down operation, the created node resources are decreased, or the corresponding node is released, including releasing the originally allocated resources.

At S205, the VIM notifies the result of node scaling to the CNM.

At S206, for the node scaling out/up operation, the CNM adds the successfully scaled-out node into the Cluster node cluster, and, if resources of an existing node are scaled-up (node resources are increased), the related node information is updated in the cluster information; and for the node scaling in/down operation, the CNM deletes the successfully retracted node from the cluster. If the resources of an existing node are retracted (node resources are decreased), the related node information is updated in the cluster information.

At S207, the CNM reports the result of node scaling to the OSS/NFVO. In addition, the update information of the Cluster node may be reported optionally. The update information includes the Cluster ID, and the node update information (e.g., ID, resources).

Figure 8:
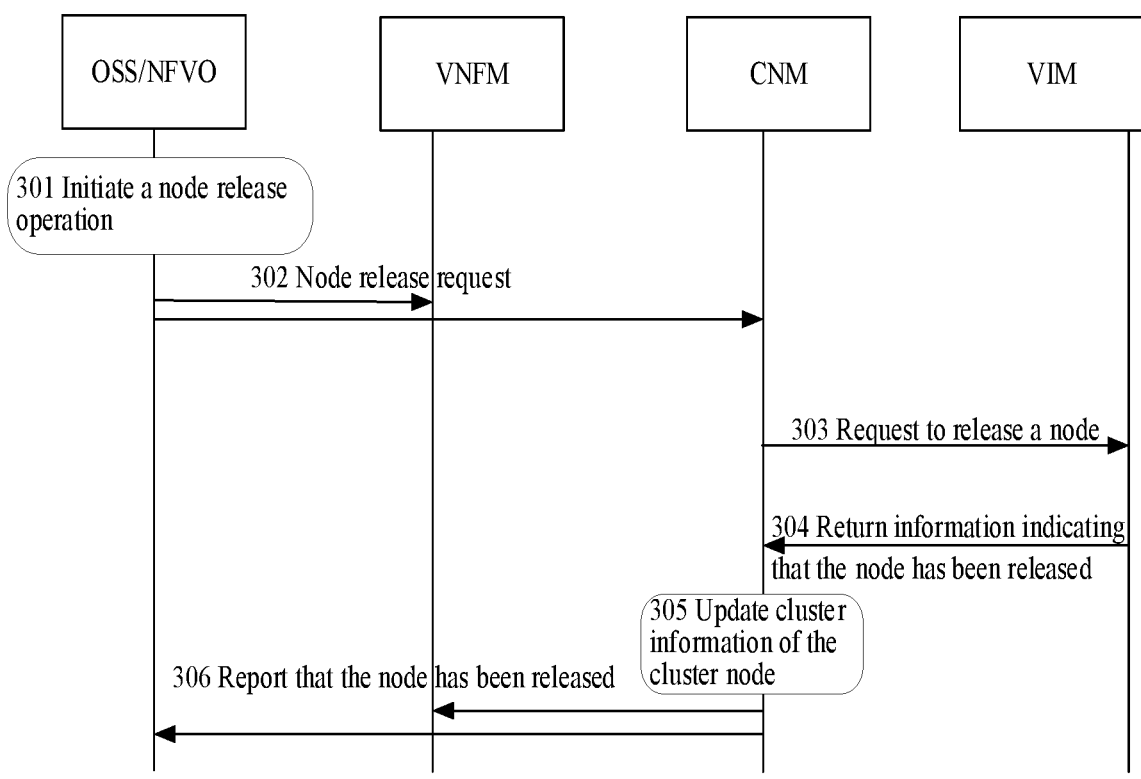
FIG. 8 is a flowchart of a node release method according to an embodiment of the present disclosure.

In a practical example, a node release process is described in the embodiment. FIG. 8 is a flowchart of a node release method according to an embodiment of the present disclosure. As shown in FIG. 8, in the embodiment, the OSS/NFVO or the CNM can release some nodes to save resources in the VIM according to the actual node requirements when idle nodes are far more than nodes required.

The OSS/NFVO initiates a node release request or the CNM initiates a node release request according to the policy, and the VIM releases the created node and the resources occupied by this node according to the node ID. After the node is released successfully, the CNM needs to update Cluster information, deletes the released node, and notifies the result of node release to the OSS/NFVO. The node release method may include steps S301 to S306.

At S301, node release can be triggered by the OSS/NFVO or actively initiated by the CNM. The OSS/NFVO can be based on the service deployment requirements. For example, if a certain network slicing service for 5G is terminated due to service expiration, for nodes for this network service, an open source application can be notified of releasing nodes.

The CNM can also actively initiate node release according to a node release policy, for example, the existing idle nodes already far exceeding the service demand or a node in a certain Cluster being abnormal.

At S302, the CNM receives the node release request initiated by the OSS/NFVO or the node release request forwarded by the VNFM, where the request message carries the Cluster identifier and the node identifier.

The CNM can also actively initiate, according to the node release policy, a node release operation for releasing idle or abnormal nodes in the Cluster.

At S303, the CNM initiates a node request to a VIM in a region where the node is located, where the node request carries the node identifier.

At S304, the VIM releases the node and the resources occupied by the node, and notify the result of node release to the CNM.

At S305, the CNM updates the cluster information, and deletes the successfully released node from the Cluster.

At S306, the CNM reports the node release result information to the OSS/NFVO. In addition, the update information of the Cluster node may be reported optionally. The update information includes the Cluster ID, and the node update information (e.g., ID, resources).

Figure 9:
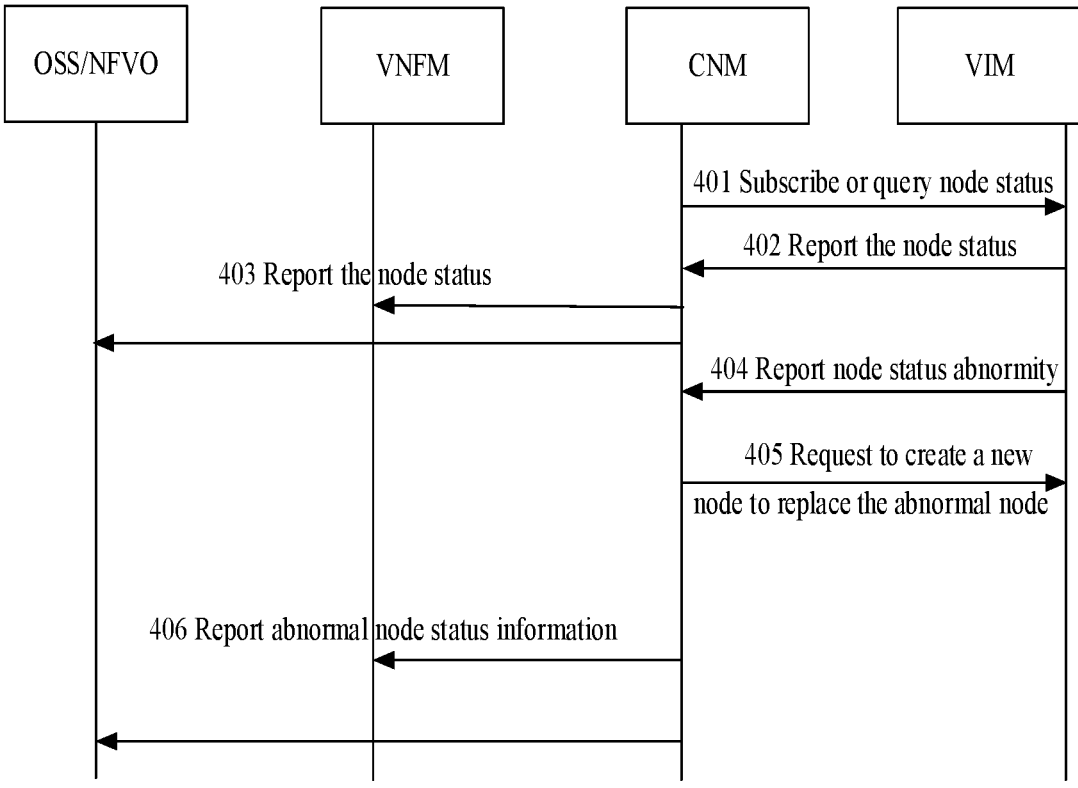
FIG. 9 is a flowchart of a node status monitoring and reporting method according to an embodiment of the present disclosure.

In a practical example, a node status monitoring and reporting process is described in the embodiment. FIG. 9 is a flowchart of a node status monitoring and reporting method according to an embodiment of the present disclosure. As shown in FIG. 9, in the embodiment, the CNM can subscribe to the VIM or dynamically query the VIM for node status information, and transmits the node information to the OSS/NFVO. When the node status is abnormal, the VIM actively reports to the CNM, and CNM searches for an alternative node in the cluster information. If no idle alternative node presents, the CNM initiates a request to the VIM to create a node to replace the abnormal node, reports node abnormity information to the OSS/NFVO, and also reports the information of the created alternative node to the OSS/NFVO. The node status monitoring and reporting process may include steps S401 to S406.

At S401, the CNM dynamically queries the VIM for node status. The CNM may subscribe to the VIM for the regularly reported node status information, or may dynamically queries the node status information actively. The query message carries the identifier of the node.

At S402, the VIM regularly transmits the node status information to the CNM according to a subscription mechanism, or returns the node status upon receiving a query request from the CNM.

At S403, the CNM reports the node status to the OSS/NFVO, or forwards the node status to the OSS/NFVO through the VNFM. The message carries the Cluster identifier, node ID, node status (idle resources and occupied resources) or other information.

At S404, when a node is abnormal, the VIM will report node abnormal status information to the CNM.

At S405, the CNM looks up whether an idle node in the Cluster presents to replace this node, and requests the VIM to create a new node having the same resources as the abnormal node if no idle node presents in the Cluster to replace this node, where this node is used to replace the abnormal node.

At S406, the CNM reports the node abnormal status information to the OSS/NFVO, and provides the identifier of the alternative node in a notification message.

Figure 10:
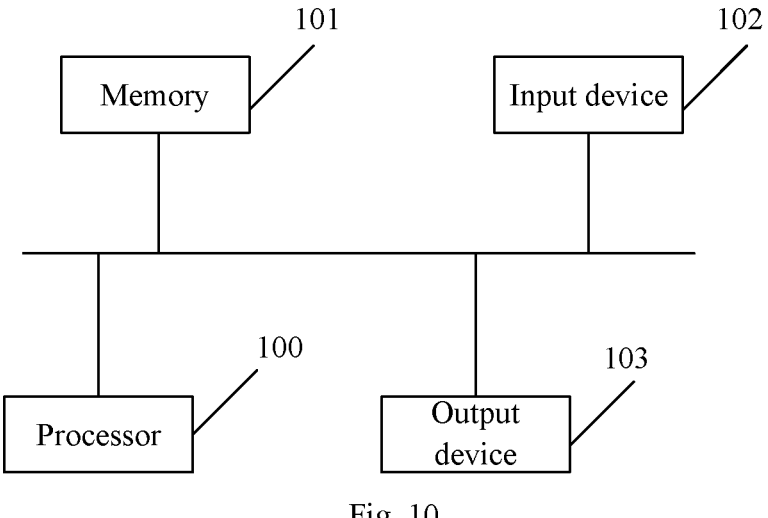
FIG. 10 is a schematic structural diagram of a cluster node manager according to an embodiment of the present disclosure.

Based on the above embodiments, according to an embodiment of the present disclosure, further provided is a cluster node manager. FIG. 10 is a schematic structural diagram of the cluster node manager according to the embodiment of the present disclosure. As shown in FIG. 10, the cluster node manager includes a processor 100, a memory 101, an input device 102 and an output device 103. One or more processors 100 may presents in the cluster node manager, and FIG. 10 is illustrated by taking one processor 100 as an example. The processor 100, the memory 101, the input device 102 and the output device 103 in the cluster node manager may be connected via a bus or in other ways, and FIG. 10 is illustrated by taking bus connection as an example.

As a computer-readable storage medium, the memory 101 can be configured to store software programs, computer-executable programs and modules, for example, program instructions/modules corresponding to the node management method in the embodiments of the present disclosure (for example, the receiving module 21 and the management module 22 in the node management apparatus). The software programs, instructions and modules stored in the memory 101, when executed by the processor 100, cause the processor 100 to executes various functional applications and data processing of the cluster node manager, so as to carry out the method according to any one of the embodiments of the present disclosure.

The memory 101 may mainly include a program storage region and a data storage region. The program storage region may store application programs required by an operating system and at least one function, and the data storage region may store data created according to the use of the terminal device, etc. In addition, the memory 101 may include high-speed random access memories, or non-volatile memories, for example, at least one magnetic disk memory device, flash memory devices or other non-volatile solid-state memory devices. In some instances, the memory 101 may include memories remotely arranged relative to the processor 100. These remote memories may be connected to the cluster node manager via a network. Examples of the network include, but not limited to, Internet, Intranet, local area networks, mobile communication networks and combinations thereof.

The input device 102 may be configured to receive input digit or character information and generate a key signal input related to user settings and function control of the cluster node manager. The output device 103 may include a display screen or other display devices.

Based on the above embodiments, according to an embodiment of the present disclosure, further provided is a storage medium containing computer-executable instructions which, when executed by a computer processor, cause the computer processor to carry out the method according to any one of the embodiments of the present disclosure.

For example, when the node management method according to the embodiments of the present disclosure is carried out, the method may include: receiving node life cycle management information; and performing life cycle management on a node based on the node life cycle management information, the node life cycle management including at least one of node creation, node scaling and node release.

In the storage medium containing computer-executable instructions provided by the embodiment of the present disclosure, the computer-executable instructions are not limited to performing the method operations descried above, and may also perform related operations in the node management method according to any one of the embodiments of the present disclosure.

From the foregoing description of the implementations, it should be clearly understood by those having ordinary skills in the art that the present disclosure may be implemented by means of software and necessary general hardware or may be implemented by means of hardware. Based on this understanding, the present disclosure may be embodied in the form of a software product. The computer software product may be stored in a computer-readable storage medium, for example, floppy disks, Read-Only Memories (ROMs), Random Access Memories (RAMs), Flash Memories (FLASH), hard disks, optical disks or the like of computers, and includes a plurality of instructions configured to cause a computer device (which may be a personal computer, a server, a network device, etc.) to execute the method according to the embodiments of the present disclosure.

It is to be noted that, in the embodiments of the node management apparatus, the units and modules included are only divided according to the functional logic, but are not limited to the above division as long as the corresponding functions can be realized. In addition, the specific name of each functional unit is merely for convenience of distinguishing from each other, and is not intended to limit the protection scope of the present disclosure.

The foregoing description merely shows the embodiments of the present disclosure, and is not intended to limit the protection scope of the present disclosure.

It should be understood by those having ordinary skills in the art that the term "user terminal" encompasses any suitable type of wireless user equipment, for example, mobile phones, portable data processing apparatuses, portable web browsers or vehicle-mounted mobile stations.

Generally, various embodiments of the present disclosure may be implemented in hardware or dedicated circuits, software, logics or any combinations thereof. For example, some aspects may be implemented in hardware, while other aspects may be implemented in firmware or software that can be executed by a controller, a microprocessor or other computing devices, although the present disclosure is not limited thereto.

The embodiments of the present disclosure may be implemented by executing computer program instructions by a data processor of a mobile device, for example, in processor entities, or by hardware, or by a combination of software and hardware. The computer program instructions may be assembly instructions, Instruction Set Architecture (ISA) instructions, machine instructions, machine-related instructions, microcodes, firmware instructions, state setting data, or source codes or target codes written in any combination of one or more programming languages.

The blocks of any logic flow in the accompanying drawings of the present disclosure may represent program steps, or may represent interconnected logic circuits, modules and functions, or may represent combinations of program steps and logic circuits, modules or functions. The computer programs may be stored on a memory. The memory may be of any type suitable for the local technical environment and may be implemented by any suitable data storage technology, for example, but not limited to, Read Only Memories (ROMs), Random Access Memories (RAMs), Optical Memory Devices and Systems (Digital versatile discs (DVDs) or Compact Disks (CDs)), etc. The computer-readable medium may include non-transient storage mediums. The data processor may be of any type suitable for the local technical environment, for example, but not limited to, general purpose computes, special purpose computers, microprocessors, Digital Signal Processors (DSPs), Application Specific Integrated Circuits (ASICs), Field-Programmable Gate Arrays (FGPAs), and processors based on a multi-core processor architecture.

The invention claimed is:

1. A node management method in a system comprising: an Operation-Support System (OSS), or a Network Function Virtualization Orchestrator (NFVO); a Virtualized Infrastructure Manager (VIM); and a Cluster Node Manager (CNM); the method being performed by the CNM, and comprising:

receiving node life cycle management information from the OSS or the NFVO; and requesting the VIM to perform life cycle management on a node of a cluster based on the received node life cycle management information, the node life cycle management comprising at least one of node creation, node scaling and node release;

updating, in response to the VIM performing the life cycle management, cluster information of the cluster, the cluster information comprising a cluster identifier and node information of all nodes in the cluster;

forwarding the updated cluster information to the OSS or NFVO;

transmitting a subscription request to the VIM, the subscription request being used to instruct the VIM to report node status information within a set time;

receiving node abnormity information fed back by the VIM, the node abnormity information being fed back by the VIM in response to presence of an abnormal node in the cluster;

looking up whether an idle node in the cluster presents to replace the abnormal node;

in response to no idle node in the cluster presenting to replace the abnormal node, transmitting a node creation request to the VIM, the node creation request carrying a node resource information model, node resources in the node resource information model being the same as node resources in the node resource information model of the abnormal node; and transmitting node abnormal status information to the OSS or the NFVO, the node abnormal status information comprising a cluster identifier of a cluster to which the abnormal node belongs, a node identifier and node resource information of the abnormal node and carrying information of a newly created node.

2. The method of claim 1, wherein the requesting the VIM to perform life cycle management on a node based on the node life cycle management information comprises:

generating a node life cycle management request based on the node life cycle management information;

transmitting the node life cycle management request to the VIM, the node life cycle management request being used to instruct the VIM to perform a node resource management operation on the node, and the VIM generating operation result information after performing the node resource management operation; and receiving the operation result information fed back by the VIM.

3. The method of claim 2, wherein in response to the node life cycle management request being a node creation request, performing life cycle management of node creation on a node based on the node life cycle management request comprises:

transmitting the node creation request to a VIM in a region to which the node belongs, the node creation request carrying a node resource information model, the node resource information model being used to instruct the VIM to create a node, the node resource information model comprising at least one of node scale, node identifier and node resource, the node resource information model being generated based on node creation information, and the node creation information comprising at least one of node type, node scale, node resource and node deployment; and receiving node creation completion information fed back by the VIM in the region to which the node belongs, the node creation completion information carrying the number of created nodes and resources allocated to nodes.

4. The method of claim 3, after the receiving node creation completion information fed back by the VIM in the region to which the node belongs, further comprising:

adding the created nodes into the cluster; and updating the cluster information.

5. The method of claim 4, after the updating the cluster information, further comprising:

transmitting node creation success information to the OSS or the NFVO, the node creation success information comprising the cluster identifier and the node information of all nodes in each cluster.

6. The method of claim 3, wherein the VIM in the region to which the node belongs is determined based on the node deployment.

7. The method of claim 2, wherein in response to the node life cycle management request being a node scaling request, performing life cycle management of node scaling on a node based on the node life cycle management request comprises:

transmitting the node scaling request to a VIM in a region to which the node belongs, the node scaling request carrying a node scaling information model, the node scaling information model comprising node scaling scale and node resource demand, the node scaling request being used to instruct the VIM to perform a node scaling operation, and the VIM generating node scaling result information after performing the node scaling operation; and receiving node scaling result information fed back by the VIM in the region to which the node belongs.

8. The method of claim 7, prior to the transmitting the node scaling request to a VIM in a region to which the node belongs, further comprising:

determining whether to initiate the node scaling request according to a node scaling policy.

9. The method of claim 8, wherein the determining whether to initiate the node scaling request according to a node scaling policy comprises:

in response to node resources being insufficient or the node scale being insufficient, initiating a node scaling out/up request, node scaling out/up comprising increasing the node resources or increasing the node scale; and in response to idle node resources being more than resources required by a service, initiating a node scaling in/down request, node scaling in/down comprising decreasing the node resources or decreasing the node scale.

10. The method of claim 7, prior to the transmitting the node scaling request to a VIM in a region to which the node belongs, further comprising:

transmitting a query request to the VIM in the region to which the node belongs, the query request being used to instruct the VIM to query whether idle resources satisfy the node resource demand;

in response to receiving that the idle resources satisfy the node resource demand, which is transmitted by the VIM in the region to which the node belongs, executing an operation of transmitting the node scaling request to the VIM; and in response to receiving that the idle resources do not satisfy the node resource demand, which is transmitted by the VIM, updating the node scaling scale and the node resource demand.

11. The method of claim 7, after the receiving node scaling result information fed back by the VIM in the region to which the node belongs, further comprising:

in response to the node scaling result information being creating a new node, adding a newly created node into a cluster;

in response to the node scaling result information being adding created node resources, updating node information of created nodes in the cluster;

in response to the node scaling result information being releasing created nodes, deleting the created nodes in the cluster; and in response to the node scaling result information being decreasing created node resources, updating node information of the created nodes in the cluster.

12. The method of claim 2, wherein in response to the node life cycle management request being a node release request, performing life cycle management of node release on a node based on the node life cycle management request comprises:

transmitting the node release request to a VIM in a region to which the node belongs, the node release request carrying a node identifier, the node release request being used to instruct the VIM to release a node and resources occupied by the node, and the VIM generating node release result information after completing the node release operation;

receiving the node release result information fed back by the VIM, the node release result information carrying an identifier of the released node; and deleting the released node from the cluster.

13. The method of claim 12, wherein the node release request is generated in one of the following cases:

more idle nodes than required nodes; or presence of an abnormal node in the cluster.

14. The method of claim 1, further comprising:

transmitting a node status query request to the VIM, the node status query request being used to instruct the VIM to report the node status information.

15. A cluster node manager in a network function virtualization system, comprising:

at least one processor; and a memory configured to store at least one program;

wherein the at least one program, when executed by the at least one processor, cause the at least one processor to carry out a node management method comprising:

receiving node life cycle management information from the OSS or the NFVO; and requesting the VIM to perform life cycle management on a node of a cluster based on the received node life cycle management information, the node life cycle management comprising at least one of node creation, node scaling and node release;

updating, in response to the VIM performing the life cycle management, cluster information of the cluster, the cluster information comprising a cluster identifier and node information of all nodes in the cluster;

forwarding the updated cluster information to the OSS or NFVO;

transmitting a subscription request to the VIMa Virtualized Infrastructure Manager (VIM), the subscription request being used to instruct the VIM to report node status information within a set time;

receiving node abnormity information fed back by the VIM, the node abnormity information being fed back by the VIM in response to presence of an abnormal node in the cluster;

looking up whether an idle node in the cluster presents to replace the abnormal node;

in response to no idle node in the cluster presenting to replace the abnormal node, transmitting a node creation request to the VIM, the node creation request carrying a node resource information model, node resources in the node resource information model being the same as node resources in the node resource information model of the abnormal node; and transmitting node abnormal status information to the OSS or the NFVO receiving the node status information fed back by the VIM, transmitting the node status information to an Operation-Support System (OSS) or a Network Function Virtualization Orchestrator (NFVO), the node abnormal status information node status information comprising a cluster identifier of a cluster to which the abnormal node belongs, a node identifier and node resource information of the abnormal node and carrying information of a newly created node.

16. A non-transitory computer-readable storage medium storing a computer program which, when executed by a processor, cause the processor to carry out the node management method of claim 1.

17. A network function virtualization system, comprising: an Operation-Support System (OSS), a Network Function Virtualization Orchestrator (NFVO), a Virtualized Infrastructure Manager (VIM) and a Cluster Node Manager (CNM);

the NFVO or the OSS being configured to transmit node life cycle management information to the CNM;

the CNM being configured to generate a node life cycle management request based on the node life cycle management information and transmits the node life cycle management request to the VIM; and the VIM being configured to perform a life cycle management operation on a node of a cluster based on the node life cycle management request;

the CNM being further configured to update, in response to the VIM performing the life cycle management, cluster information of the cluster to which the node belongs, the cluster information comprising a cluster identifier and node information of all nodes in the cluster; and forwarding the updated cluster information to the OSS or NFVO;

the CNM being configured to transmit a subscription request to the VIM, the subscription request being used to instruct the VIM to report node status information within a set time; receive node abnormity information fed back by the VIM, the node abnormity information being fed back by the VIM in response to presence of an abnormal node in the cluster; look up whether an idle node in the cluster presents to replace the abnormal node; in response to no idle node in the cluster presenting to replace the abnormal node, transmit a node creation request to the VIM, the node creation request carrying a node resource information model, node resources in the node resource information model being the same as node resources in the node resource information model of the abnormal node; and transmit node abnormal status information to the OSS or the NFVO, the node abnormal status information comprising the cluster identifier of the cluster to which the abnormal node belongs, a node identifier and node resource information of the abnormal node and carrying information of a newly created node.

* * * * *